Feb. 24, 1959  H. E. VANN  2,874,871
BAR FEED FOR MACHINE TOOLS
Filed Oct. 17, 1955  9 Sheets-Sheet 1

Feb. 24, 1959 H. E. VANN 2,874,871
BAR FEED FOR MACHINE TOOLS
Filed Oct. 17, 1955 9 Sheets-Sheet 9

United States Patent Office 2,874,871
Patented Feb. 24, 1959

2,874,871
BAR FEED FOR MACHINE TOOLS

Henry Edwin Vann, Leicester, England, assignor to Ratby Engineering Company Limited, Earl Shilton, England, a British company Application October 17, 1955, Serial No. 540,700

Claims priority, application Great Britain October 21, 1954

7 Claims. (Cl. 221—13)

This invention concerns bar feeds for machine tools such, for instance, as capstan lathes, automatic or semi-automatic lathes, centreless grinders, and so on.

By a "bar feed" is meant, in this specification, an apparatus of the form comprising, in combination, a stand upon which is mounted a long and horizontally disposed tube adapted to receive and support a bar or rod to be converted by a machine tool into successively produced machined work components, a pusher element which is slidable axially within the tube and is arranged to act upon the appropriate end of the supported bar or rod, and means for imparting to the pusher element in the appropriate direction a driving force sufficient for pressing upon the said end of the bar or rod and pushing the latter forward for the purpose of feeding it into the machine tool as required.

In one particular form of an apparatus of this kind, the pusher element is associated with a part which extends through and is slidable along a longitudinal slot formed in the tube, and to this part is attached a flexible element which is influenced by a weight of a predetermined value, the weight functioning to impart, through the medium of the flexible element, the required forward driving force.

With a bar feed in use the stand is located in line with the machine tool in conjunction with which it is to be used, and the leading end of the bar or rod supported in the tube is fed through a collet in the machine. This collet is adapted to close upon and grip the bar or rod and, when the leading portion of the latter has been machined and cut off to produce a work component, the said collet is opened as a result of which the bar or rod is fed forwards again into the collet by the pusher element.

The principal disadvantage of a bar feed as heretofore constructed is that after a bar or rod has been converted into machined components and the pusher element has been drawn back, for instance, against the action of a weight, to its original starting position, a fresh bar or rod has to be inserted into the supporting tube from the leading end thereof and pushed thereinto in an axial direction. Owing to the substantial length of a bar feed tube, and hence also of a bar or rod to be supported thereby this initial step of inserting and pushing such a bar or rod into the tube requires considerable space. In fact, it is usually necessary, in practice, to leave for this purpose a comparatively wide and clear corridor between groups of machines, thus wasting valuable floor space. Quite apart from this, however carefully lathes or other machine tools and associated bar feeds are disposed, the operation of inserting a fresh bar or rod into any one bar feed tube often interferes with an adjoining machine to the extent of temporarily interrupting production thereon.

From the foregoing it will also be appreciated that the insertion of a fresh bar or rod into a bar feed tube is a time-consuming operation.

A bar feed as usually constructed heretofore, moreover necessitates the provision therein of a flexible element in the form of a relatively great length of cable all in one piece which is not easy to handle.

The object of the present invention is to provide a generally improved bar feed designed to obviate the foregoing disadvantages. In particular, the invention aims at effecting an economy in space whilst at the same time facilitating the operation of placing a fresh bar or rod into the tube.

In the improved bar feed constituting this invention, the tube is divided longitudinally into two sections which are separable suchwise as to open the tube at one side, and means are provided for effecting separation of the said tube sections and simultaneously acting upon a fresh bar or rod located on an adjoining support so that it is permitted to move laterally into the tube through the opening therein.

In a convenient embodiment of the invention, the lower one of two superimposed tube sections is fixed upon and supported by a plurality of spaced brackets forming part of the bar feed stand, whilst the relatively movable upper tube section is carried by levers connected by a shaft arranged to turn in said brackets.

For simultaneously turning all of the connected levers and so raising the upper tube section to open the appropriate side of the tube for reception of a fresh bar or rod, all that would be necessary in a simple form of the apparatus is to provide one of the levers with a handle readily accessible to the operator of the machine tool. Preferably, however, provision is made for automatically opening the tube as a consequence of the pusher element being returned to its original starting position after a bar or rod has been used up. Conveniently for this purpose, a component secured on and turnable with the shaft by which the levers are connected is provided with a cam adapted to be acted upon by a part of or on a slidable bracket carrying the pusher element. Thus, as the bracket approaches the end of each reverse, i. e. idle, stroke it functions to push aside the said component and thereby turn the connected levers suchwise as to raise the upper tube section.

The pusher element may be returned to its original starting position, each time a bar or rod has been used up, either manually or automatically. For manual operation the slidable pusher element bracket may be furnished with a knob or handle. But when the bracket is to be automatically returned, the driving means for imparting the idle strokes thereto may be actuated electrically, hydraulically or pneumatically. For example, the said bracket may be attached to a weight-influenced endless chain passed around chain wheels, in which instance one of these wheels may be adapted to be driven, in a direction to return the pusher element to its starting position, by an electric motor which is switched on and off by two automatically operable limit switches located at respectively opposite ends of the apparatus. In such an arrangement, one of the limit switches is operated to switch on the motor as the pusher element reaches the end of an operative stroke, and the other limit switch is operated to switch off the motor each time the pusher completes a reverse stroke.

The aforementioned support adjoining the bar feed tube is preferably in the form of an inclined rack or the like adapted to carry several bars or rods arranged one behind another, the arrangement being such that each time the tube is opened, the bar or rod then nearest to the tube is automatically displaced from an abutment or abutments at the front, i. e. lowest portion, of the rack and is permitted to roll laterally into the open tube, the remainder of the supported bars or rods thereupon rolling down the rack or the like to fill the space vacated by the bar or rod deposited in the tube. That is to say, each time a bar or rod is displaced and permitted to roll into the open tube, the next bar or rod in the series supported on the rack or the like rolls into contact with the abutment or abutments in readiness for use when required.

If a single abutment is provided this may consist of a flat section bar constituting a bridge which extends longitudinally across the brackets of the stand and is disposed adjacent to the fixed lower tube section. But if, as is preferred, a plurality of spaced abutments is provided these may be carried by a lateral extension of the lower tube section. In either event, the top face or faces of the abutment or abutments which is or are forwardly inclined, lies or lie flush with the lower edge of the side opening into the bar feed tube. The said top face or faces accordingly constitutes or constitute a surface or surfaces down which a bar or rod can roll after it has been projected upwards from the rack or the like.

For the purpose of projecting a fresh bar or rod and lifting it bodily to a position in which it is free to roll laterally down over the abutment or abutments into the open tube, the connected tube-opening levers may conveniently be provided with rearwardly directed arms which are furnished with projectors disposed immediately beneath the first bar or rod on the rack or the like. Thus, each time the levers are turned forwardly to open the tube, the said rearwardly directed arms will be raised to lift the projectors and so displace the relevant bar or rod.

The stand of the improved bar feed apparatus may be furnished with vertical legs each of which is of a telescopic character and adjustable heightwise to enable the tube to be accurately positioned horizontally and in alignment with the collet of the machine tool.

In order that the invention may be more clearly understood and readily carried into practical effect, a specific constructional form of the improved bar feed incorporating a pusher element which is automatically returned to its starting position after a bar or rod has been used up will now be described, by way of example, with reference to the accompanying drawings, wherein, Figures 1A and 1B together constitute a front elevational view of the complete bar feed, Figures 2A and 2B similarly constitute a plan view.

Like parts are designated by similar reference characters throughout the drawings.

Referring to the drawings, the horizontally disposed tube adapted to receive and support a bar or rod is indicated at 1. As will be seen more clearly in Figures 4 and 5, the tube is divided longitudinally into upper and lower sections 1a and 1b, the upper section 1a being separable (upwardly) from the lower section so as to open the tube at one side. The lower one, 1b, of the two superimposed tube sections is fixed upon and supported by a plurality of spaced brackets 2 forming part of the bar feed stand. The upper tube section 1a, on the other hand, is carried by spaced levers 3 which are rigidly secured upon and connected by a shaft 4 which extends parallel with the axis of the bar feed tube 1 and is mounted to turn in bearings in the spaced brackets 2.

Figures 8, 9:
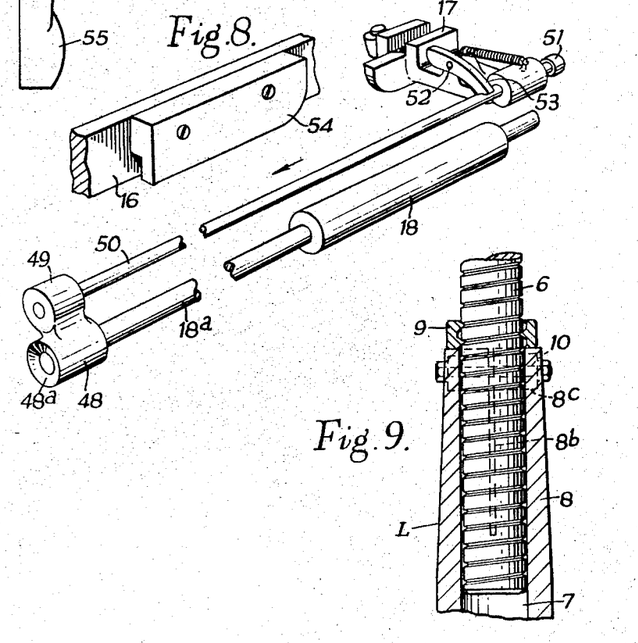
Figure 8 is a detail perspective view illustrating means provided in the apparatus for centralising bars or rods of smaller diameter than the bore of the longitudinally divided tube and thereby facilitating the action of the pusher element on such bars or rods.
Figure 9 is a detail vertical sectional view depicting the manner in which the telescopic legs of the bar feed stand are adjusted heightwise.

As illustrated in Figures 1A, 1B, 4 and 5, these brackets 2 are each formed with a suitably bored vertical boss 5 in which is secured the upper end of a depending steel rod 6 of circular cross section forming one portion of a telescopic leg L with a series of which the bar feed stand is furnished. Each of these depending rods 6 is screw-threaded externally (see Figure 9), and is slidable up and down in a vertical hole 7 formed in the lower cast portion 8 of the relevant telescopic leg L. The cast portions 8 of the legs are provided at their lower extremities with flat feet 8a adapted to rest upon the floor. Supported on the open upper end of each lower cast leg portion 8 is a nut 9 tapped to engage the exterior screw-threads on the corresponding depending rod 6. Accordingly, by turning the nuts 9 in the appropriate directions, the depending rods 6 can be caused to move up or down within the vertical cast portions 8 to vary the effective lengths of the legs L and so adjust the respective heights of the brackets 2 in relation to the ground. In this way the tube 1 is enabled to be accurately positioned horizontally and in alignment with the collet of the machine tool. The upper end of each cast lower portion 8, moreover, is split vertically at 8b and is formed with lugs 8c adapted to be gripped together by a clamping screw 10 for the purpose of securing the cast portion to the depending rod 6 after an adjustment. By screw-threading rods 6 which are a little undersize in relation to the screwing dies employed, the external teeth produced on these rods may be of flattened or truncated form so that they cannot be easily damaged.

The rear portions of the brackets 2 have top faces 2a (see Figures 4 and 6) which slope upwards and rearwards. To these faces are secured metal angles 11 which extend rearwardly beyond the backs of the brackets 2, in alignment therewith, and are connected at their outer ends by a longitudinally extending angle bar 12. The connected angles 11 together constitute an inclined rack which adjoins the longitudinally divided bar feed tube 1 and is adapted to support several bars or rods arranged one behind another. A few of such bars or rods are indicated at 15 in Figures 4 and 6. The brackets 2 are further connected together, at their lower ends, by a front rod 13. Certain of the brackets at the right-hand side of the apparatus are additionally connected by a rear rod 14 which is spaced from and extends parallel to the front rod 13. Also forming part of the framework of the bar feed stand is a bar 16 of flat section which is disposed in a vertical plane and extends from end to end of the apparatus above, parallel to and a little in front of the horizontal tube 1. The bar 16 forms a slideway and guide for a slidable bracket 17 serving to carry the pusher element 18 which, as previously explained, is movable axially within the tube 1 for action upon the appropriate end of a bar or rod 15 supported in said tube suchwise as to push the supported bar or rod forwards and feed it into a machine tool as required.

The rear marginal edge 1c of the fixed lower tube section 1b is extended rearwardly so that it is inclined with its underside in a plane parallel to the inclined top faces of the angles 11. Secured to the underside of the marginal edge 1c are spaced abutments 19 the top faces of which are rabbetted to receive this edge. As will be seen in Figures 4 and 6, the top faces of the spaced abutments 19, which latter are forwardly inclined, lie flush with the lower edge of the side opening 20 into the bar feed tube 1. There may conveniently be one abutment 19 resting on the angle 11 at each bracket 2, and further similar abutments may be provided at locations between these brackets. In any event, the arrangement is such that each time the tube 1 is opened, by swinging forward the levers 3 and so raising the upper tube section 1a, by means presently to be described, the bar or rod 15 then nearest to the tube is automatically displaced, by upward projection, from the rear sides of the abutments 19 at the front, i. e. lowest portion, of the rack and is permitted to roll laterally into the open tube, the remainder of the supported bars or rods 15 thereupon rolling down the rack to fill the space vacated by the bar or rod deposited in the tube. That is to say, each time a bar or rod 15, is displaced and permitted to roll into the open tube, the next bar or rod in the series supported on the rack rolls into contact with the rear faces of the abutments 19 in readiness for use when required. The inclined top faces of these abutments accordingly constitute surfaces down which a bar or rod can roll after it has been projected upwards from the rack.

For the purpose of projecting a fresh bar or rod 15 and lifting it bodily to a position in which it is free to roll down laterally over the abutments 19 into the open tube 1, the connected tube-opening levers 3 are provided with rearwardly directed arms 3a (see Figure 4) which are furnished with projectors 21 disposed immediately beneath the first bar or rod 15 on the rack. Thus, each time the levers 3 are turned forwardly to open the tube 1, the arms 3a will be raised to lift the projectors 21 and so displace the relevant bar or rod. To enable the improved bar feed to deal with bars or rods of different diameters or diametral dimensions, the projectors 21 are made adjustable along the rearwardly directed arms 3a. For this purpose, each projector 21 is longitudinally slotted at 21a to receive the shank of a screw or bolt 22 employed to secure the projector to the arm. Accordingly, the projectors can be correctly set forwardly or rearwardly with reference to the axis of the leading bar or rod 15 on the inclined rack. If, as may sometimes happen, the projectors 21 are required to be moved right forwards for action on bars or rods of comparatively small diameters, the projectors can project up freely in the spaces or graps between the abutments 19.

As an alternative to the spaced separate abutments 19, it is also possible to use a single, i. e. common, abutment in the form of a flat section bar constituting a bridge arranged to extend longitudinally across the brackets 2. In this alternative case, the rear marginal edge of the single abutment may be gapped at appropriate intervals to enable the projectors to project up therethrough whenever required to do so.

Figure 4:
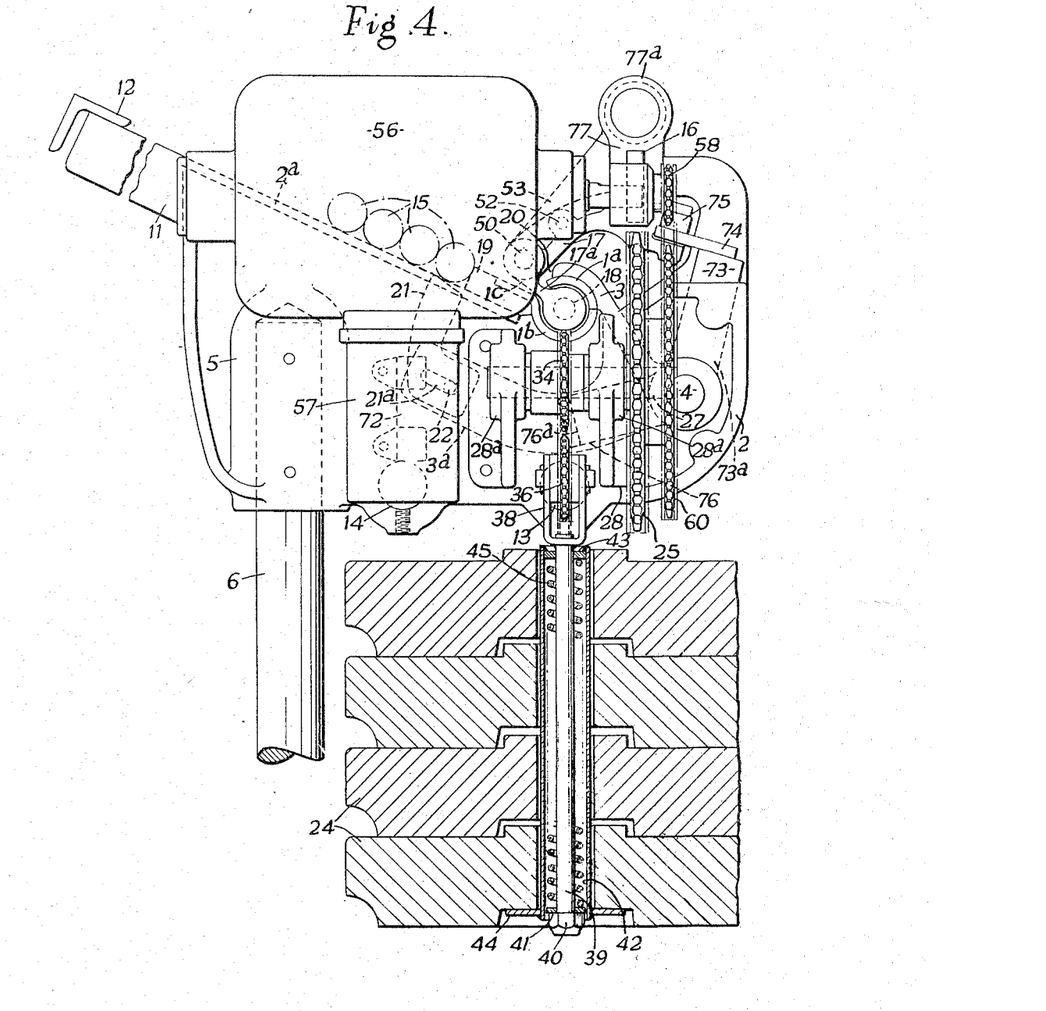
Figure 4 is an end view of the same as seen in the direction of the arrow A in Figure 3.
Figure 6:
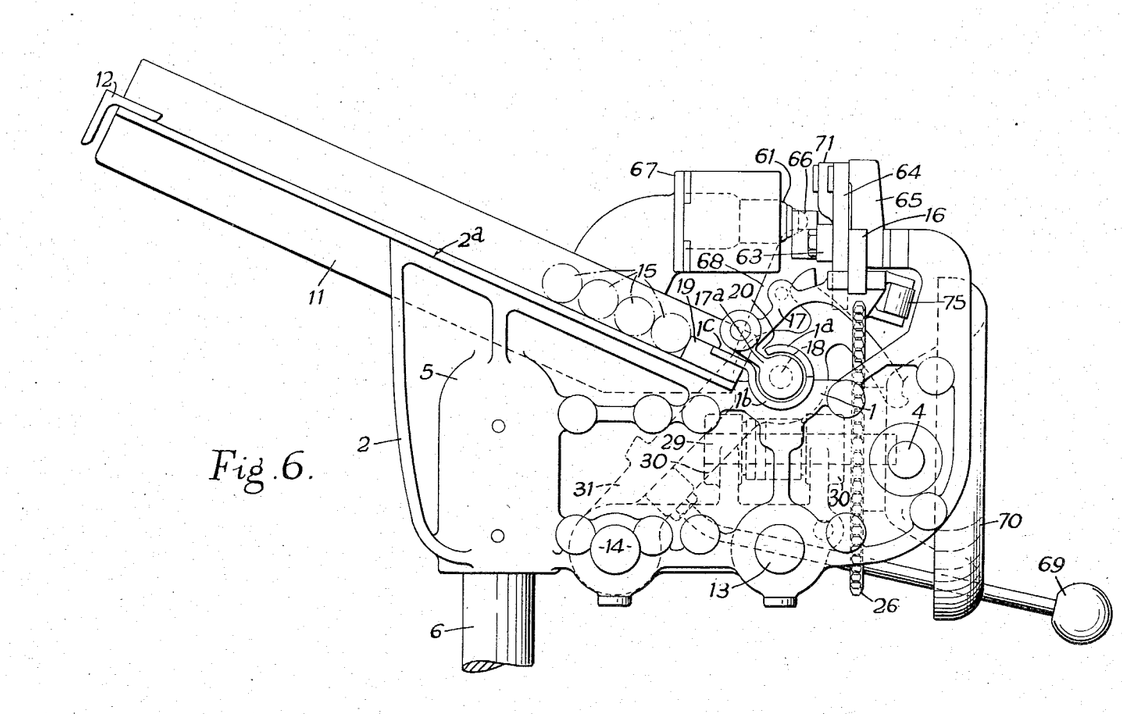
Figure 6 is an end view of the same as seen in the direction of the arrow B in Figure 5.

It is to be clearly understood that even when the bar feed tube 1 is closed, as shown in Figures 4 and 6, there will still be left therein (at 20) a longitudinally extending slot through which extends a relatively thin portion 17a of the bracket 17 of the pusher element 18 which bracket is, as will be appreciated, in the nature of a pusher element actuating-component. If, as is preferred and shown, this slot is provided in the rear side of the tube 1, i. e. the side nearest to the abutments 19, then the major portion of the bracket 17 adjoining the thin portion 17a thereof, extends first upwardly and then forwardly so as to extend above and in front of the said tube.

Figure 5:
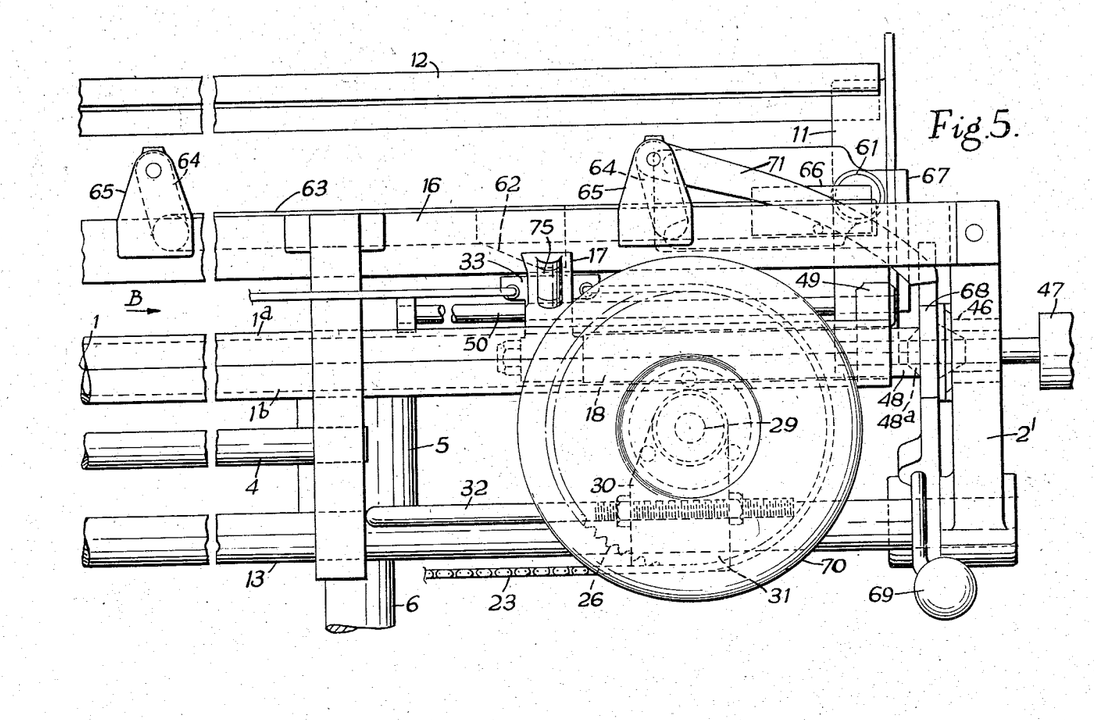
Figure 5 is a detail front elevational view of the mechanism shown at the upper right-hand corner of Figure 1B.

For pulling along the bracket 17, guided by the slideway 16, from the left-hand end to the right-hand end of the bar feed apparatus for the purpose of causing the operative end 18a of the pusher element 18 to exert a constant and continuous pressure upon the appropriate end of a bar or rod being fed into a machine, there is provided an endless chain 23 adapted to be impelled forwards by weights 24. The said chain, which may conveniently be of the roller type, is passed, at the left-hand side of the bar feed stand, around a chain wheel 25 and, at the right-hand side of the stand, around a further chain wheel 26 of the same diameter. The chain wheel 25 is rigidly secured upon a short shaft 27 which is mounted for rotation freely in bearings provided in the spaced arms 28a of a forked or bifurcated bracket 28 attached to the outer side of the adjacent bracket 2. The chain wheel 26 on the other hand, is rigidly secured upon a shaft 29 journalled in bearings provided in arms 30 of a further bracket 31 which latter is mounted on and is adjustable along the front and rear rods 13 and 14. For tensioning the pusher element impelling chain 23, the bracket 31 is furnished with a longitudinally adjustable short rod 32 the free, i. e. outer, end of which is arranged to impinge on the opposing side of the nearest bracket 2 (see Figure 5). Thus, by adjusting the position of the bracket 31 longitudinally along the rods 13 and 14, and effecting a corresponding adjustment of the short rod 32 within the said bracket, any slackness in the chain 23 can be taken up. As depicted in Figure 5, the pusher element bracket 17 is secured to the said chain by means of an attachment plate 33.

Figure 1A:
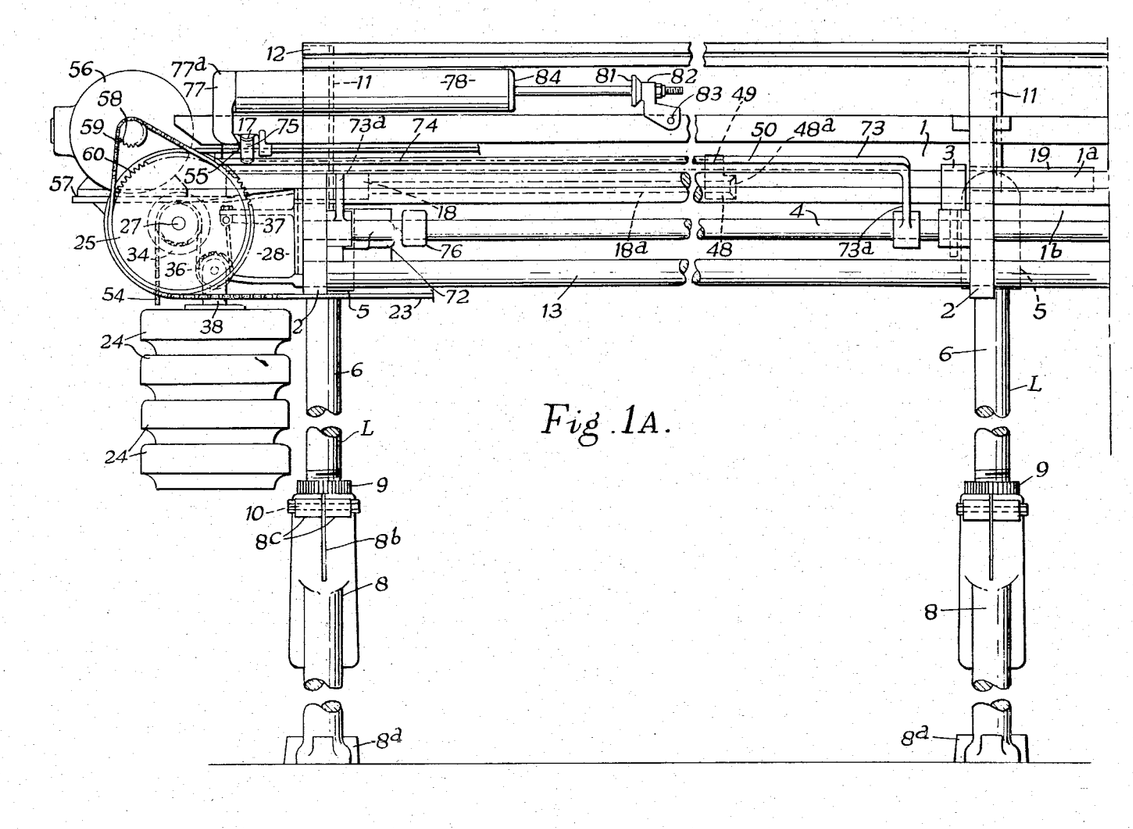
Figure 1B:
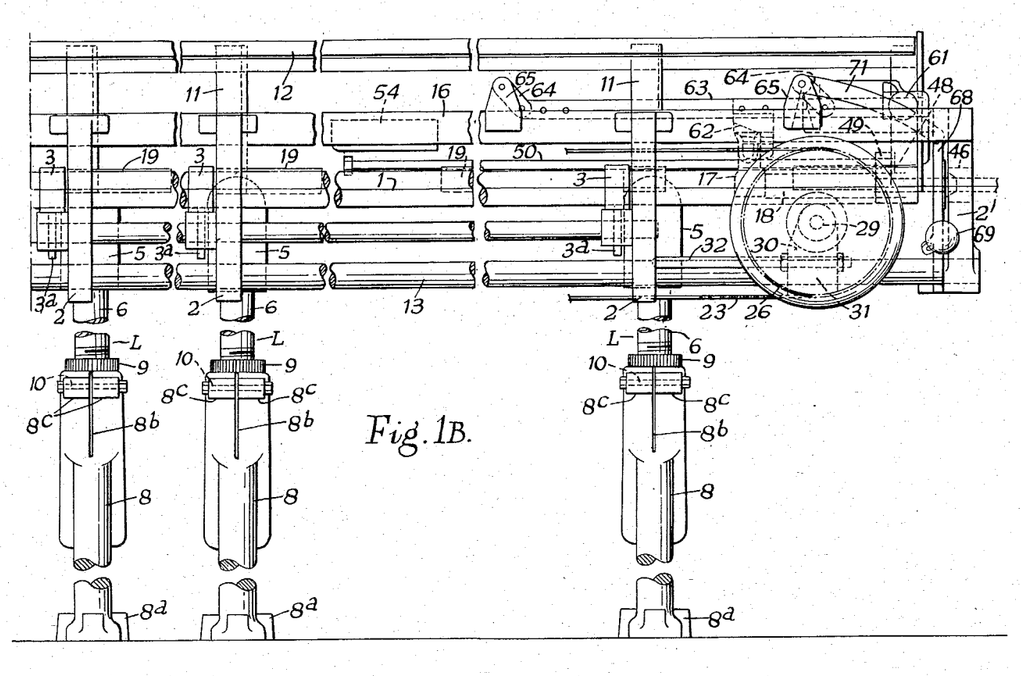
Figure 2A:
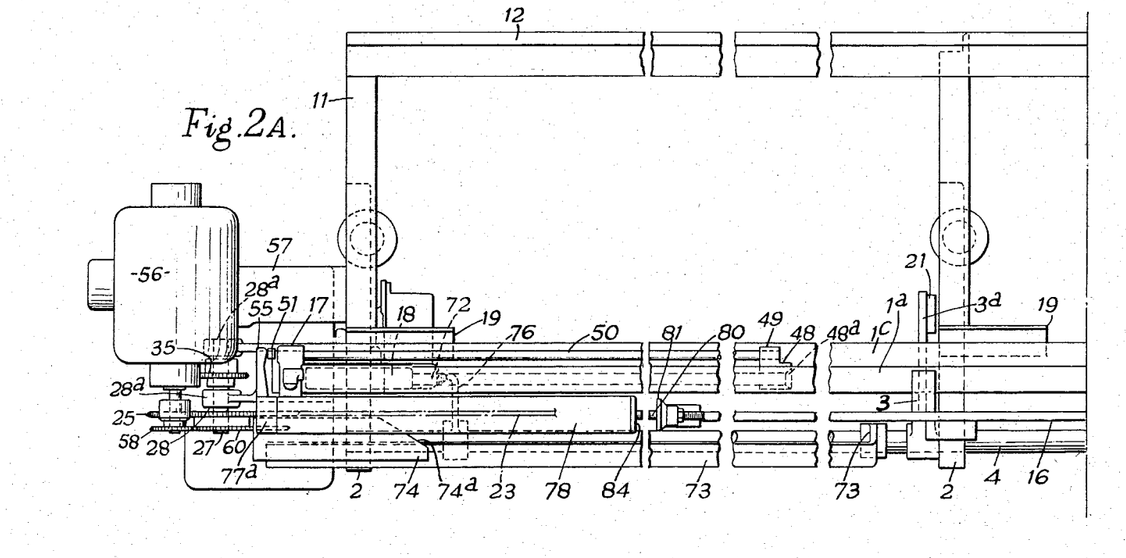
Figure 2B:
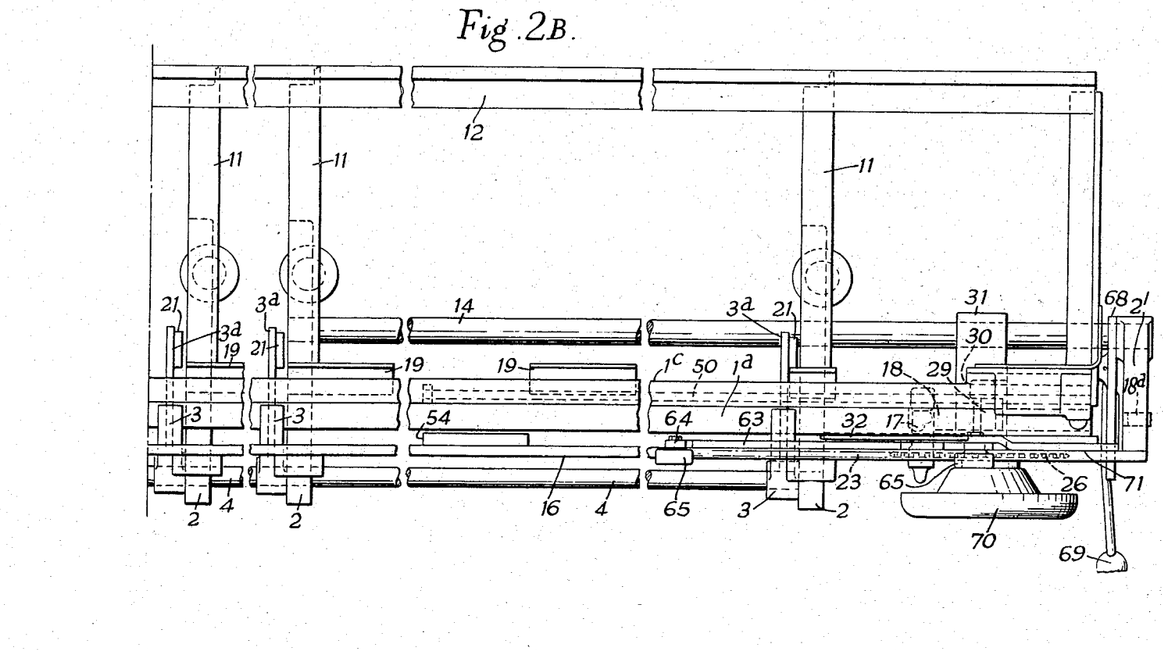
Figure 3:
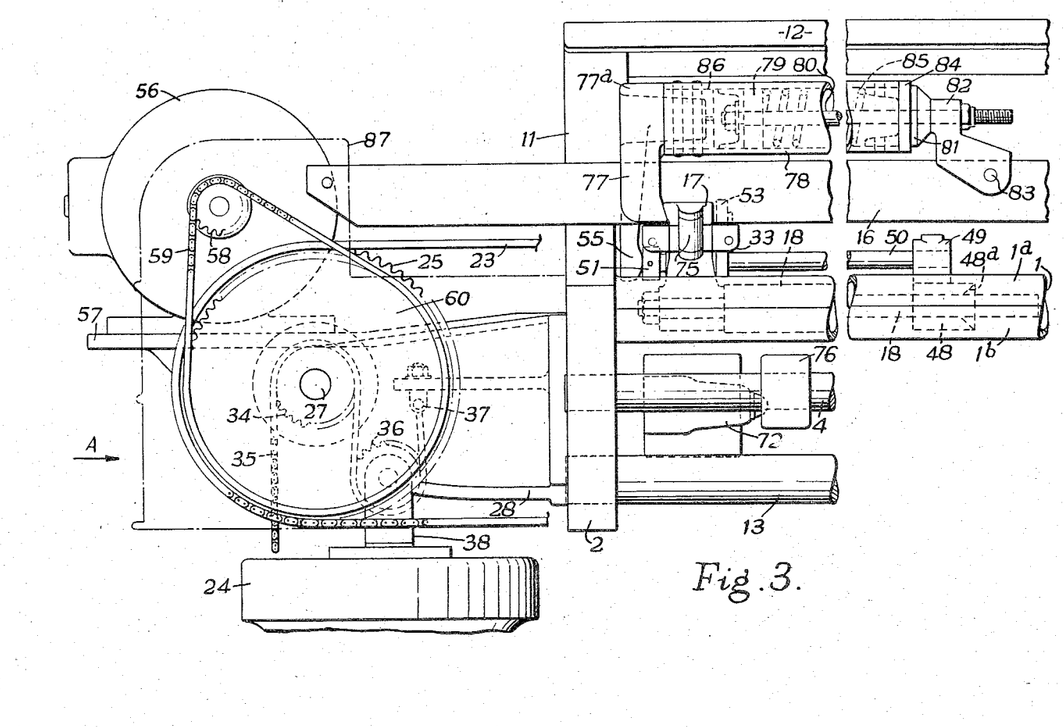
Figure 3 is a detail front elevational view of the mechanism shown at the upper left-hand corner of Figure 1A.

Also rigidly secured upon the shaft 27, between the arms 28a of the bracket 28, is a weight-driven hoist sprocket 34 over which is passed a weight-influenced chain 35. As shown in Figure 3, this chain 35 passes around the lower portion of a weight sprocket 36, from which the weights 24 are suspended, and then extends upwards for a short distance where it is anchored to a fixed anchor stud 37. The value of the load functioning to drive the sprocket 34 and hence also the chain wheel 25 can be readily varied by changing the weights 24. Referring to Figure 4, it will be seen that the weight sprocket 36 is mounted in a clevis 38 from which depends a rod 39 at the lower end of which is provided a nut 40 serving to support a washer 41. Arranged to surround the rod 39 is a concentric tube 42 within the upper end of which is welded a washer 43 and on the outside of the lower end of which is a flange 44. A compression spring 45 surrounding the depending rod 39 is interposed between the underside of the fixed washer 43 and the top side of the external flange 44. The superimposed weights 24 are supported by this flange and threaded onto the tube 42. There is, therefore, a yieldable connection between the clevis 38 and the load, and since the clevis is restrained, the weights 24 and the tube 42 carrying them compress the spring 45. In this way, downward inertia of the weights is absorbed.

At the extreme right-hand side of the apparatus, as viewed from the front, there is a bracket 2' which ties together the rods 13 and 14 and the bar 16, and in this bracket is mounted a guide bush 46 so set as to be coaxial with the mandrel 47 (Figure 5) of the machine tool into which bars or rods 15 are to be fed. A bar or rod being fed extends through this bush. Now for the purpose of centralising a bar or rod of smaller diameter than the bore of the divided bar feed tube 1, and thereby facilitating the action upon the rear end of said bar or rod of the operative end 18a of the pusher element 18, there is fitted upon the latter a "false nose" 48 the leading end of which is internally coned at 48a as illustrated more clearly in Figure 8. Whenever the pusher element 18 is being impelled from left to right by the weight-driven chain 23, the false nose 48 (which engages the rear end of a bar or rod of small diameter and cams it into co-axial alignment with the operative end 18a of the pusher element) is locked to the said element. When, however, the pusher element 18 approaches the termination of an operative stroke the false nose 48 is uncoupled from the element and, by virtue of coming into contact with the guide bush 46 (see Figure 5), is arrested, so permitting the pusher element to continue its travel, by sliding through the nose, and itself penetrate the guide bush 46. As shown more clearly in Figures 3 and 8, the false nose 48 is formed with a bored lateral extension 49 in which is secured the forward end of a control rod 50 extending parallel to the pusher element 18. The opposite, i. e. tail, end of this control rod is slidable through the bracket 17 and has mounted thereon a stop collar 51 employed for a purpose presently to be described. Pivoted at 52 upon the bracket 17 is a spring-influenced latch 53 the operative end of which is normally engaged in a notch formed in the control rod 50. A cam 54 secured upon the rear face of the guide bar (slideway) 16 is adapted, at the appropriate stage of an operative stroke of the pusher element 18, to act on the latch 53 and turn it against the spring action for the purpose of disconnecting the false nose 48 from the pusher element. Conversely, when the pusher element is automatically returned to its original starting position in the manner hereinafter to be described, preparatory to feeding a fresh bar or rod, the stop collar 51 comes into contact with an abutment 55 to ensure re-engagement of the latch 53 with the notch in the control rod 50; in this way, recoupling of the false nose to the pusher element is made certain.

For the sake of convenience in illustration, the bracket 17 of the pusher element 18, the false nose 48 and the associated mechanism is shown at both ends of the apparatus. In actual practice, of course, and since there is only one pusher element, the latter cannot be at both ends at the same time.

To drive the chain 23 in the reverse direction to that in which it is impelled by the weights 24, and so restore the pusher element 18 to its original starting position at the left-hand end of the apparatus, preparatory to a fresh bar or rod being permitted to roll into the bar feed tube 1, there is provided a small electric motor 56 mounted upon a bracket 57. To the appropriate end of the motor spindle is secured a chain sprocket 58 with which is engaged an endless chain 59 arranged also to pass around a motor driven chain wheel 60 secured on the front end of the shaft 27. Whenever the pusher element 18 is making an operative stroke from left to right the motor is switched off, but upon such a stroke being terminated, a limit switch 61 is automatically operated to start up the motor and thereby drive the pusher element from right to left. This is effected in the following manner:

At the appropriate instant, the pusher element bracket 17, during its travel, contacts a cam 62 mounted upon a link 63 connecting two short swing arms 64 (see Figures 5 and 6). These arms are pivoted upon brackets 65 attached to the fixed guide bar 16. Now the swingable link 63 also carries a cam 66 adapted, when the said link is shifted to the right (as a consequence of contact of the pusher bracket 17 with the cam 62), to operate the limit switch 61 and start up the motor 56. The reference numeral 67 indicates a fixed support for the switch 61.

In order to prevent a fresh bar or rod 15 from moving uncontrolled through the guide bush 46 to the back of the collet, there is provided at the right-hand end of the apparatus a swing stop 68 which is pivoted upon the rear rod 14 and, when permitted, swings down in front of and closes the entrance to the said bush. Thus, when a new bar or rod 15 contacts the swing stop 68 in this position, it is arrested and cannot move forward into the machine until the swing stop has been manually raised, by means of a handle 69, to uncover the entrance to the guide bush 46. This enables the operator to exercise manual control over the forward movement of a new bar or rod into the machine by a handwheel 70 secured upon the front end of the shaft 29. Whenever the swing stop 68 is raised by the handle 69 to open the bush the stop becomes automatically engaged and retained by a catch arm 71. Since, as will be seen in Figure 5, this catch arm is rigid with the right-hand swing arm 64, it follows that when the link 63 is displaced to operate the limit switch 61, the said catch arm will also be raised to release the stop 68 as a result of which the latter will swing down to close the guide bush 46.

Whenever the chain 23 has been driven sufficiently far by the motor 56 to restore the pusher element 18 to its starting position, the motor is automatically switched off again by operation of another limit switch 72 and, simultaneously, the shaft 4 is turned to swing forward the levers 3 and so raise the upper tube section 1a to open the longitudinally divided bar feed tube 1. As previously explained, whenever the levers 3 are swung forward for this purpose, the arms 3a will also be turned up to raise the projectors 21 with the result that a new bar or rod 15 will be projected and roll down the inclined top faces of the abutments 19 into the open tube 1. To achieve these ends, there is rigidly connected to the shaft 4, by means of short arms 73a, a longitudinally extending bar 73 which is turnable with the said rod and functions as a support for a cam 74 having an inclined edge 74a for engagement by a roller 75 fitted on the pusher element bracket 17. Consequently, as the bracket 17 reaches a location corresponding to or approaching the starting position of the pusher element 18, the roller 75, in acting on the cam 74, pushes aside the cam support bar 73 and thereby turns the shaft 4 to open the tube 1. At the same time a lever 76 also rigid with the shaft 4 and having an inclined cam face 76a (Figure 4) acts on and operates the limit switch 72 to switch off the motor 56.

Figure 7:
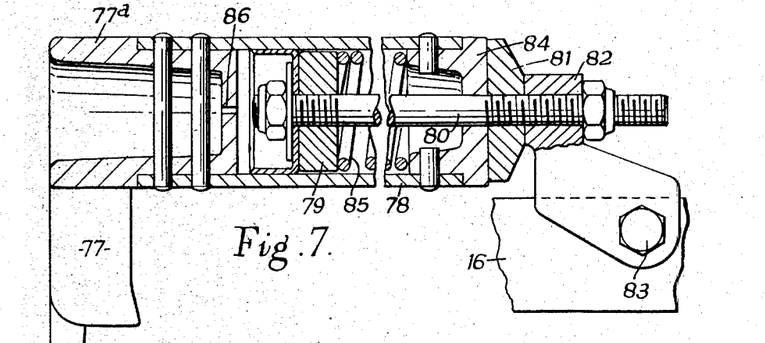
Figure 7 is a longitudinal cross-sectional view of a spring damper employed to provide a cushioned stop for the pusher element at its left-hand limit of travel.

To arrest the reverse movement of the pusher element 18 when the motor is switched off, there is provided a "cushioned" stop 77. This stop, which is depicted in Figure 7, is in the form of a bifurcated component arranged to straddle and have limited sliding movement along the guide bar 16. Incidentally, it is an arm integral with the cushioned stop component 77, which is formed with the aforementioned abutment 55 arranged for co-operation with the stop collar 51. Surmounting the cushioned stop 77 is a cylindrical portion 77a which is secured within the left-hand end of a horizontally disposed spring damper tube 78. Within this tube is fitted a damper piston 79 attached to a rod 80 the outer, i.e. right-hand, end of which is furnished with a stop nut 81 and is supported in a small bracket 82. The bracket 82 is forked and bolted at 83 to the fixed guide bar 16. The stop nut 81 is normally contacted by a plug 84 serving to close the right-hand end of the tube 78. Surrounding the rod 80 is a compression spring 85 which is interposed between the back of the piston 79 and the inner side of the plug 84. A small air escape hole 86 is formed in the closed end of the cylindrical upper portion 77a of the stop 77. The construction is, therefore, such that as the pusher element bracket 17 makes contact with, and is arrested by, the stop 77 the latter yields to absorb the shock, this resilience arising from the fact that the tube 78 is pulled along the rod 80 against the action of the spring 85. Reaction of the spring is dampened by the air-controlled piston 79.

It will be noted from Figure 3 that the left-hand end of the guide bar 16 is anchored to a chain guard indicated in dot-and-dash lines at 87.

It will be appreciated that whilst, in the herein described specific example, the bracket 17 and the pusher element 18 carried thereby are automatically returned by electrical means, hydraulically or pneumatically operated means may alternatively be employed for the same purpose.

Briefly, the sequence of events when operating the illustrated bar feed apparatus is as follows:

Assume a bar or rod has just been used up. The pusher element 18 having arrived at the right-hand of the apparatus results not only in the swing stop 68 being released from the open position and permitted to rest on said element but also in operation of the limit switch 61 to start up the motor 56. The motor then rapidly returns the pusher element to the left-hand end of the apparatus as a consequence of which the bar feed tube 1 opens to enable a fresh bar from the inclined rack to roll into it, and the limit switch 72 is operated to stop the motor. The pusher element is arrested by the cushioned stop 77 and thereupon immediately commences to move to the right again under the influence of the weights 24. The swing stop 68, which previously closed upon withdrawal of the pusher element therefrom, now limits the forward movement of the new bar or rod. The operator, having in the meantime removed the short end of the old bar or rod from the collet, opens the swing stop 68 by raising the handle 69, and is then able, using the hand wheel 70, to control the movement of the bar or rod into the collet of the machine tool.

In a simplified form of the apparatus, the means for automatically returning the pusher element to its original starting position are dispensed with, and the pusher element bracket is fitted with a knob or handle whereby it can be returned manually after a bar or rod has been used up. Alternatively, the pusher element may be arranged to be wound back to its starting position as the result of the operator turning a handle.

But in a fully automatic version of the improved apparatus, the swing stop 68 and the hand wheel 70 are dispensed with, and any appropriate automatic means are provided for feeding forward a bar or rod straight into the machine collet. Such automatic means may be motivated and controlled electrically, hydraulically, pneumatically or in any other convenient way and are not in this case influenced by a weight. The said means, moreover, operate intermittently to feed a bar or rod forwards in accordance with the requirements of the machine tool, and in this regard the means may advantageously be controlled by or from the conventional cam drum or equivalent employed to determine the working cycle of the machine tool.

The bar feed stand is preferably also provided below the bar feed tube 1, with supports for a supply of bars or rods, an appropriate number of the latter being transferred to the inclined rack as occasion demands.

It is also within the scope of the invention to employ, in lieu of an inclined rack, a vertically disposed magazine for accommodation of a series of superimposed bars or rods, means being provided to release the lowermost bar or rod from the magazine and deposit it at the back of the abutments 19 on the bridge each time the bar feed tube 1 is opened.

I claim:

1. A bar feed apparatus for a machine tool comprising, in combination, a stand, a horizontally disposed tube mounted upon said stand, said tube being divided longitudinally into two superimposed sections which are separable in such a way as to open the tube at one side and enable it to receive a bar to be converted by the machine tool into successively produced work components, a plurality of spaced brackets forming part of the stand and upon which the lower section of the tube is supported and fixed, these brackets having therein aligned bearings, a shaft which extends parallel with the tube and is mounted to turn in the bearings, levers rigidly secured upon said shaft and carrying the upper tube section, a support adjoining the openable side of the tube for carrying a supply of bars for insertion one at a time into the tube as required, a pusher element which is slidable axially within the tube and is arranged to act on the appropriate end of a bar received into the tube, means imparting to the pusher element in the appropriate direction a driving force sufficient for pressing upon the said end of the bar and pushing the latter forward for the purpose of feeding it into the machine tool as required, a carrier for the pusher element, a slideway along which said carrier is transversible and by which it is guided, a component secured on and turnable with the aforesaid shaft, a cam provided on the said component and arranged to be acted upon by a part on the pusher element carrier, the arrangement being such that as the carrier is returned to its original starting position after a bar has been used up it acts on the cam and pushes aside the said component thereby turning the connected levers suchwise as to raise the upper tube section, and means associated and turnable with said levers to simultaneously act upon a fresh bar located on the support so that said bar is displaced and permitted to move laterally into the tube through the opening therein.

2. A bar feed apparatus for a machine tool comprising, in combination, a stand, a horizontally disposed tube mounted upon said stand, said tube being divided longitudinally into two superimposed sections which are separable to open the tube at one side and enable it to receive a bar to be converted by the machine tool into successively produced work components, a plurality of spaced brackets forming part of the stand and upon which the lower section of the tube is fixed and supported, connected levers arranged to turn on said brackets and carrying the relatively movable upper tube section, a support adjoining the openable side of the tube for carrying a supply of bars, said support being in the form of an inclined rack, abutment means at the lowest portion of the rack against which the bar on the rack nearest to the tube rests, arms provided on the aforesaid connected levers, projectors on said arms disposed so as to be beneath the said bar on the rack nearest to the tube, means turning the connected levers raising the upper tube section to open the tube and also, by said projectors, displacing the bar nearest the tube from and over said abutment means so that the bar is permitted to roll laterally into the open tube, the remainder of the bars on the rack thereupon rolling down the rack to fill the space vacated by the bar deposited in the tube, a pusher element which is slidable axially within the tube and is arranged to act on the appropriate end of the bar received into the tube, and means imparting to the said pusher element in the appropriate direction a driving force sufficient for pressing upon the said end of the bar and pushing the latter forward for the purpose of feeding it through the tube into the machine tool as required.

3. A bar feed apparatus for a machine tool comprising, in combination, a horizontally disposed tube which is divided longitudinally into two sections separable to open the tube at one side and enable it to receive a bar to be converted by the machine tool into successively produced work components, a support adjacent the tube for carrying a supply of bars, means opening the tube and simultaneously displacing a bar on the support so that this bar is permitted to move laterally into the open tube, a pusher element arranged to press on the appropriate end of said bar in the tube, a bracket carrying said element, a slideway along which said bracket is transversible and by which it is guided, an endless chain to which said bracket is attached, chain wheels at opposite ends of the apparatus around which the chain is passed, means driving the chain in one direction to feed the bar through the tube into the machine tool as required, an electric motor driving one of the chain wheels, and hence the chain, in the reverse direction to return the pusher element to its starting position each time a bar has been used up, a limit switch at the end of the apparatus nearest the machine tool for switching on the motor, connections which are operable to actuate said limit switch and are arranged in the path of the pusher element bracket whereby as the latter completes an operative traverse it acts on and displaces said connections, another limit switch at the opposite end of the apparatus for switching off the motor, and means actuating said last mentioned switch as the pusher element bracket approaches the end of a reverse stroke.

4. A bar feed apparatus for a machine tool comprising, in combination, a stand, a horizontally disposed tube mounted upon said stand, said tube being divided longitudinally into two superimposed sections which are separable in such a way as to open the tube at one side and enable it to receive a bar to be converted by the machine tool into successively produced work components, a plurality of spaced brackets forming part of the stand and upon which the lower section of the tube is supported and fixed, these brackets having therein aligned bearings, a shaft which extends parallel with the tube and is mounted to turn in the bearings, levers rigidly secured upon said shaft and carrying the upper tube section, a support adjoining the openable side of the tube for carrying a supply of bars for insertion one at a time into the tube as required, a pusher element which is slidable axially within the tube and is arranged to act on the appropriate end of a bar received into the tube, a bracket carrying said element, a slideway along which said bracket is traversible and by which it is guided, an endless chain to which said bracket is attached, chain wheels at opposite ends of the apparatus around which the chain is passed, means driving the chain in one direction to feed the bar through the tube into the machine tool as required, an electric motor driving one of the chain wheels, and hence the chain, in the reverse direction to return the pusher element to its starting position each time a bar has been used up, a limit switch at the end of the apparatus nearest the machine tool for switching on the motor, connections which are operable to actuate said limit switch and are arranged in the path of the pusher element bracket whereby as the latter completes an operative traverse it acts on and displaces said connections, another limit switch at the opposite end of the apparatus for switching off the motor, a component secured on and turnable with the aforementioned shaft, a cam provided on said component and arranged to be acted upon by a part on the pusher element bracket so that as the latter is returned by the motor to its starting position it acts on the cam and pushes aside the said component thereby turning the connected levers suchwise as to raise the upper tube section, means associated and turnable with said levers to simultaneously act upon a fresh bar located upon the support so that said bar is displaced and permitted to move laterally into the tube through the opening therein, and a switch-actuating lever rigid with said shaft and having a cam face for actuating the last mentioned limit switch whereby as the connected levers are turned to raise the upper tube section the said switch-actuating lever is simultaneously actuated.

5. A bar feed apparatus for a machine tool having a work-holding collet, said apparatus comprising, in combination, a horizontally disposed tube which is divided longitudinally into two sections separable to open the tube at one side and enable it to receive a bar to be converted by the machine tool into successively produced work components, a support adjacent the tube for carrying a supply of bars, means opening the tube and simultaneously displacing a bar on the support so that this bar is permitted to move laterally into the open tube, a pusher element which is slidable axially in the tube and is arranged to press on the appropriate end of a bar therein, a bracket carrying said element, a slideway along which said bracket is traversible and by which it is guided, an endless chain to which said bracket is attached, chain wheels at opposite ends of the apparatus around which the chain is passed, means driving the chain in one direction to feed the bar through the tube into the machine tool as required, an electric motor driving one of the chain wheels, and hence the chain, in the reverse direction to return the pusher element to its starting position each time a bar has been used up, a limit switch at the end of the apparatus nearest the machine tool for switching on the motor, connections which are operable to actuate said limit switch and are arranged in the path of the pusher element bracket whereby as the latter completes an operative traverse it acts on and displaces said connections, another limit switch at the opposite end of the apparatus for switching off the motor, means actuating said last mentioned switch as the pusher element bracket approaches the end of a reverse stroke, a guide bush through which the bar is fed into the collet, a stop which is displaceable in directions to cover and uncover the entrance to the guide bush, said stop, when operative to close the bush, preventing a fresh bar from moving in an uncontrolled fashion to the collet, and a catch member serving to retain the stop in an inoperative position clear of the guide bush during operative traverses of the pusher element, said catch member being combined with the aforementioned switch-actuating connections and moved to release the stop so that it can cover the bush whenever these connections are displaced by the pusher element bracket.

6. A bar feed apparatus according to claim 5, wherein the displaceable stop is provided with a handle whereby it is manually re-engageable with the catch member.

7. A bar feed apparatus for a machine tool comprising, in combination, a horizontally disposed tube which is divided longitudinally into two sections separable to open the tube at one side and enable it to receive a bar to be converted by the machine tool into successively produced work components, a support adjacent the tube for carrying a supply of bars, means opening the tube and simultaneously displacing a bar on the support so that this bar is permitted to move laterally into the open tube, a pusher element which is slidable axially in the tube and is arranged to press on the appropriate end of said bar, a bracket carrying said element, a slideway along which said bracket is traversible and by which it is guided, means driving said bracket in a direction to cause the pusher element to feed the bar through the tube into the machine tool as required, a nose which is fitted onto the operative end of the pusher element and is internally coned at its leading end for the purpose of centralising a bar of smaller diameter than the bore of the tube and thereby facilitating the action of the pusher element upon the end of the bar, the pusher element being movable relatively to said nose, a notched control rod to which the nose is connected, said rod being slidable through the pusher element bracket, a spring-influenced latch mounted on said bracket and adapted for engagement in the notch in the control rod, and fixed cam means to engage and trip the latch suchwise as to uncouple the nose from the pusher element as the nose reaches the appropriate end of the apparatus during an operative traverse of said element.

References Cited in the file of this patent

UNITED STATES PATENTS

| | | |
|---|---|---|
| 1,765,825 | Cork | June 24, 1930 |
| 1,776,260 | Johnson | Sept. 23, 1930 |
| 1,954,964 | Tessky | Apr. 17, 1934 |
| 2,320,039 | Jobert | May 25, 1943 |
| 2,407,638 | Gettig et al. | Sept. 17, 1946 |
| 2,640,511 | Harney | June 2, 1953 |